INVENTOR.
WILLIAM RANDOLPH TUCKER

INVENTOR.
WILLIAM RANDOLPH TUCKER
BY
ATTORNEY

United States Patent Office 3,209,149
Patented Sept. 28, 1965

3,209,149
INFRARED THERMOGRAPHIC APPARATUS WHEREIN THE SCANNING SYSTEM COMPRISES TWO MIRRORS ROTATABLE ABOUT ORTHOGONAL AXES
William Randolph Tucker, Stamford, Conn., assignor to Barnes Engineering Company, Stamford, Conn., a corporation of Delaware
Filed May 9, 1963, Ser. No. 279,179
2 Claims. (Cl. 250—65)

This invention relates to an improved infrared thermograph.

Infrared thermographs, for example, the thermograph described in the patent to Astheimer and Wormser No. 2,895,049, have achieved practical success. Essentially these thermographs operate by scanning the image of an infrared detector across a scene to be thermographed transforming the infrared signal into electrical signals and using these signals to control the intensity of a visible light source. The light is then scanned across a photographic film. In the thermograph described in the patent and in all of the practical thermographs which have been sold there is a mirror which is moved in synchronism with the infrared scanning so that the lines traced on the photographic film correspond to the lines scanned on the object to be thermographed by the image of the detector.

In practical instruments, which have been sold heretofore, it is customary to have the infrared scanning effected by a moving mirror to which is attached the mirror directing the light beam on the photographic film. It will be apparent that the infrared scanning and the corresponding visible light thermogram produced are in the form of a raster of lines reminescent of a television display on a kinescope face but with somewhat lower resolution.

An essential requirement of thermographs produced heretofore is that the scanning means has two motions. It oscillates from side to side scanning the series of lines which are normally horizontal and will be so designated in the remainder of the specification and a vertical movement or nutation so that successive lines are displaced vertically. The vertical scan may be continuous, but at a much slower rate than the horizontal scan, or it may be intermittent, the nutational movements occurring in discrete steps at the end of each horizontal scan.

One of the most promising practical fields of infrared thermography is in medical diagnosis. Thermograms of different parts of the human body are capable of giving important diagnostic information. Normally a patient to be thermographed is lying on a bed or table. It is not practical and not safe to suspend a heavy thermograph above the patient and, therefore, it is customary to employ a mirror above the patient which is aligned with the thermograph itself so that the image of the detector is scanned across the mirror and reflected down onto the patient. Ordinarily the mirror is maintained at 45° although this angle is not essential to the operation of the thermograph for medical thermography. The thermograph itself is, of course, mounted on a tripod or other suitable stand which can be moved and aligned with the stationary mirror.

Since the stationary mirror is needed in any event to produce the medical thermograms the present invention makes use of a similar mirror which is caused to perform multiple functions and the resulting thermograms are of improved definition at their edges. While the present invention is of primary interest in medical thermography it should be realized, of course, that the optical system is not concerned with the nature of the object thermographed or with the use to which the thermogram is put. However, for simplicity the invention will be described in connection with medical thermography.

Essentially the vertical scanning is effected by a movement of the reflecting mirror about an axis in the horizontal plane. The mirror then performs two functions, that is it folds the light path so that positions of the object to be thermographed and the thermograph itself can be suitably arranged and it also performs the function of vertical scanning. The thermograph proper which, although an essential part of the thermograph system of the present invention and operating substantially synchronously therewith, is a separately movable piece of equipment which scans horizontally and does not scan vertically. This is not to say that the thermographic system or combined thermograph of the present invention cannot use an ordinary thermograph with means for nutating the scanning system but the movement in nutation would then be shut off. For purely medical work, of course, a simpler and cheaper scanning head is possible as the composite horizontal scanning and nutation is no longer necessary which permits more compact, lighter and more rugged scanning means.

Since the vertical scanning is effected by movement of the folding mirror, the light source actuated by infrared detector output would normally be scanned along a single line only and the present invention, therefore, requires that there be means for vertically displacing the light lines on the photographic film. This means may move the film itself or rather the camera back in which the film is located or any other means may be used to effect a vertical displacement of successive light lines. Needless to say these vertical scanning means must be in desired synchronism with the angular movement of the folding mirror which effects the vertical infrared scanning. This, however, presents no problem as the two motions can be connected electrically to operate in synchronism. While it is important that the folding mirror be indexed with the movement of the film it is not necessary that the two motions proceed in exact synchronism. If the turning is at constant speed and in approximate synchronism this gives satisfactory results. Of course, where intermittent motion of the folding mirror is provided with movement at the end of each horizontal scanning line precise synchronism is required.

Not only does the present invention utilize the folding mirror, which is necessary for medical thermography or for the thermography of objects similarly placed to perform two functions, namely the folding of the light path and vertical scanning but an improved thermogram is produced. In an ordinary thermograph in which the scanning means operates about two axes, one for horizontal scanning and the other for nutation for vertical scanning, the edges of the photograph are distorted because when the scanning means nutates the horizontal scan is not an absolute straight line except for the central line coinciding with the axis of nutation. This results in the ends of the lines being a different distance apart than the centers of the lines producing a keystoning effect. With many thermograms the vertical field represents a fairly small angle, for example it may be 10°. With small angles the keystoning is not so great as to render the resulting thermogram useless but it does degrade the resolution at the edges of the final thermogram when compared to the center. All keystoning is eliminated by the present invention because the folding mirror turns about a single axis since there is no horizontal motion. This reflects onto the aligned scanning mirror, or other means of the thermograph proper, a straight line in the center of the scanning means. The slow turning of the folding mirror brings successive adjacent straight lines to the scanning means of the thermograph proper and each time the line is accurately centered so that the horizontal scanning in the thermograph proper is along a straight line and not along a slightly curved line as is the case when the scanning means has to nutate. As a result keystoning is eliminated entirely and a perfect thermogram is produced except, of course, for the unavoidable and negligible distortion due due to the fact that the light path in horizontal scanning varies a little from the center to the ends of each line. This distortion is so slight that it is easily within the circle of confusion of the photographic film. The keystoning distortion of the ordinary thermograph is, of course, very much greater and does cause perceptible degradation of resolution at the edges.

The present invention has an additional practical advantage. When the vertical scanning was effected in the thermograph itself the folding mirror had to have sufficiently large vertical dimensions so that the beam or light path to the thermograph at the two extremes of vertical motion still struck the mirror. In the present invention where the folding mirror directs a beam which does not move vertically its vertical dimensions can be much smaller. All that is necessary is that it receive the full beam at its extreme position. A horizontally, but not vertically, long mirror presents many advantages not the least of which is a great reduction in weight. The present invention, therefore, permits using a folding mirror with a much smaller vertical dimension without any adverse effect on the resulting thermogram.

The invention will be described in greater detail in conjunction with a thermograph head which uses a perforated plane scanning mirror and a converging mirror as is described in the Astheimer and Wormser patent referred to above. Essentially the present invention is not concerned with the mechanical design of the horizontal scanning and, therefore, the description is typical only of one common scanning design.

The invention will also be described in greater detail in conjunction with the drawings in which.

Figure 1:
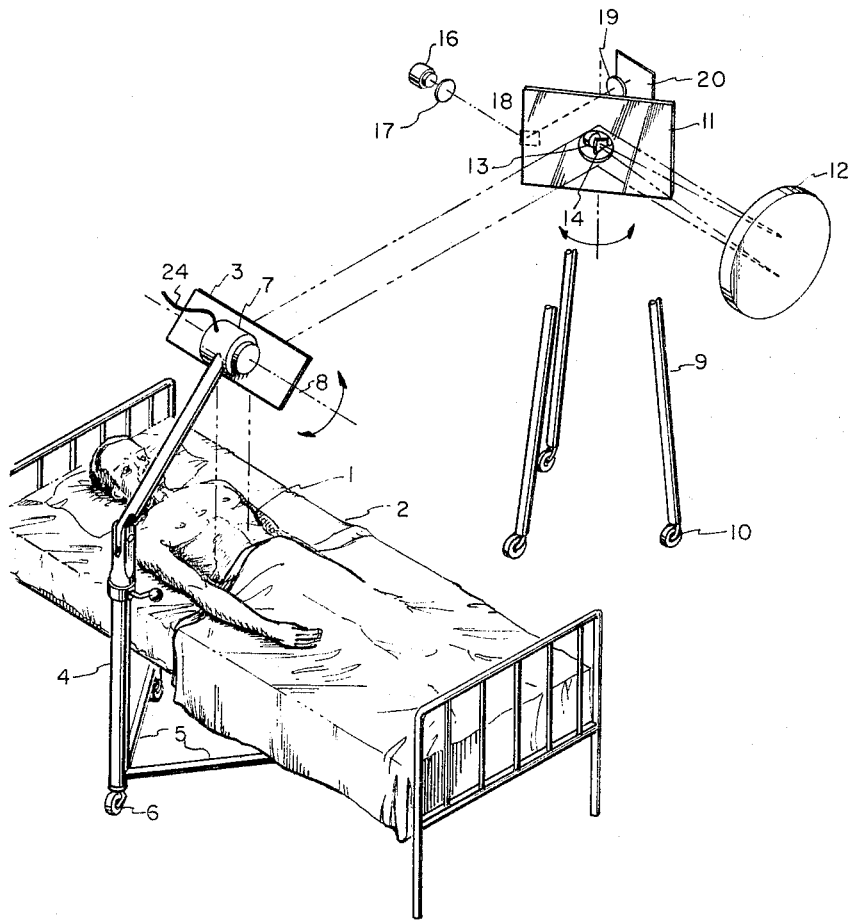
FIG. 1 is an isometric view with the thermograph head in diagrammatic form.

In FIG. 1 the patient to be thermographed is shown at 1 lying on a hospital bed 2. Over the patient is mounted a folding mirror 3 on a jointed framework 4 provided with two long legs 5 which extend under the bed and provide for a firm and rigid mounting for the folding mirror. The whole framework moves on casters 6 which are of the conventional locking type, the locking mechanism not being shown.

The folding mirror is provided with a motor and high reduction gear train 7. This turns the mirror 3 about a horizontal axis indicated at 8, the arc of motion being shown by the curved arrow. The present invention is not concerned with the mechanical design of the motor and gear train except that the motor must be capable of synchronization with another motor moving the camera back as will be described below. Since the details of the motor and its high reduction gear train form no part of the present invention it is shown as a housing in diagrammatic form.

The thermograph head proper is mounted on a tripod 9 on locking casters 10. The thermograph, of course, has a housing but as the present invention is concerned primarily with the optical paths and not at all with the exact mechanical structure the housing is not shown. The thermograph is preferably lined up so that it is at the same height as the folding mirror 3 and moved so that the central line on the scanning mirror 11 of the thermograph is parallel to the axis 8 of the folding mirror 3. Focusing is effected in conventional manner by means of the concave mirror 12, the focusing mechanism being conventional it is not shown so that the light paths are more clear in the diagram.

Figure 2:
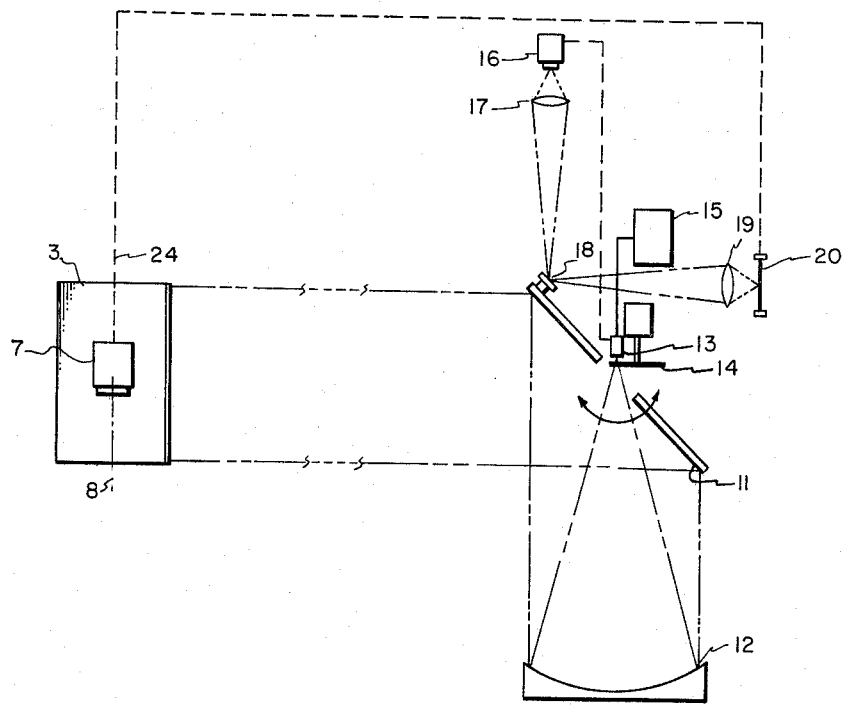
FIG. 2 is a horizontal section through the thermograph head.

The incoming radiation is focused onto a detector 13 behind a chopper 14. This, as other details of the thermograph head, is best shown on FIG. 2. The infrared detector is shown purely diagrammatically and it may be a thermistor mounted in a black body cavity which is a temperature reference source. In such a case the backs of the blades of the chopper 14 are mirrored. Alternately the backs of the chopper blades may be blackened and constitute an ambient temperature reference source. The output of the detector 13 is processed in conventional processing circuits 15 and controls the intensity of a glow tube 16. This glow tube projects light which is formed into a beam by the lens 17 reflected from a mirror 18 on the horizontal scanning mirror 11 and is then imaged by the lens 19 onto a photographic surface 20. Horizontal scanning is by means of the mirror 11 and results, therefore, in a scanning of the beam from the glow tube on the film surface 20 in substantial synchronism with the infrared scan on the detector. The film surface is, of course, in a camera back with a conventional bellows to exclude stray light. As these structural features are conventional they are not shown so that the diagrammatic light paths appear more clearly.

Figure 3:
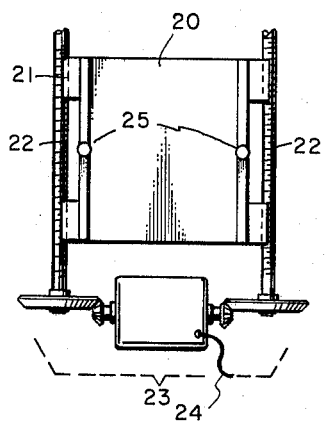
FIG. 3 is a detail of the film plane moving means.

FIG. 3 shows a detail of the camera back transporting mechanism. The back 20 is provided with four threaded spring pressed members 21 which bear against two precision lead screws 22. These screws are driven by a motor and gears shown diagrammatically at 23. The motor connects through cable 24 with the motor which turns the folding mirror 3. The gearings are such that the film moves the right amount to space light lines vertically at the same rate that lines are scanned by the infrared. When a thermogram is taken the members 21 are manually disengaged from the screws by squeezing together the two handles 25 so that the camera back can be moved quickly to its initial position to take another thermogram.

I claim:

1. A thermograph system comprising a thermograph head having an infrared detector, means for scanning the image of the infrared detector in a straight horizontal line, a light source actuated in proportion to detector output and a film holder positioned to receive light reflected from the light source and scanned horizontally in synchronism with the infrared detector scanning comprising, (a) a flat folding mirror at a position to fold the light path to the infrared detector from a horizontal object plane, means for moving the folding mirror about a horizontal axis at right angles to the thermograph scanning axis, at least intermittently, to effect vertical displacement of successive lines on the object plane on the axis of the horizontal scanning means, (b) the folding mirror and the means for scanning the infrared detector in a horizontal line being oriented so that the horizontal line extends across the folding mirror substantially parallel to the folding mirror's horizontal axis, and (c) means for producing relative movement of the photographic surface holding means and the horizontal scanning means to cause successive horizontal lines of light from the light source to be scanned thereon, the photographic surface moving means and the means for moving the folding mirror being synchronized.

2. A thermograph system according to claim 1 in which the folding mirror means and relative photograph surface moving means are continuous.

References Cited by the Examiner
UNITED STATES PATENTS 2,895,049  7/59  Astheimer et al. _____ 250—65
3,025,515  3/62  Fairbanks _____ 250—83.3

RALPH G. NILSON, *Primary Examiner.*

ARCHIE R. BORCHELT, *Examiner.*